US006816873B2

(12) United States Patent
Cotner et al.

(10) Patent No.: US 6,816,873 B2
(45) Date of Patent: Nov. 9, 2004

(54) METHOD FOR MANAGING DISTRIBUTED SAVEPOINTS ACROSS MULTIPLE DBMS'S WITHIN A DISTRIBUTED TRANSACTION

(75) Inventors: Curt L. Cotner, Gilroy, CA (US); James W. Pickel, Gilroy, CA (US); Julie A. Watts, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 09/858,735

(22) Filed: May 15, 2001

(65) Prior Publication Data

US 2002/0174108 A1 Nov. 21, 2002

(51) Int. Cl.[7] .......................... G06F 12/00; G06F 17/30
(52) U.S. Cl. ............................. 707/201; 707/8; 707/10
(58) Field of Search ................................. 707/200–203, 707/1–5, 10

(56) References Cited

U.S. PATENT DOCUMENTS

| | | | |
|---|---|---|---|
| 5,465,328 A | * 11/1995 | Dievendorff et al. | 714/15 |
| 5,553,239 A | 9/1996 | Heath et al. | 713/201 |
| 5,630,124 A | * 5/1997 | Coyle et al. | 707/103 R |
| 5,870,758 A | * 2/1999 | Bamford et al. | 707/201 |
| 6,047,285 A | * 4/2000 | Jacobs et al. | 707/4 |
| 6,185,577 B1 | * 2/2001 | Nainani et al. | 707/202 |

FOREIGN PATENT DOCUMENTS

| | | | |
|---|---|---|---|
| EP | 0657813 A1 | 6/1995 | G06F/11/14 |
| JP | 08153027 | 6/1996 | G06F/12/00 |

OTHER PUBLICATIONS

Strom, R.E. and S. Yemini "Optimistic Recovery in Distributed Systems", ACM TRansaction on Computer Systems, vol. 3, No. 3, pp. 204–226, Aug. 1985.*
Oracle "Oracle7 Server Concepts Manual", downloaded from www.oracle.com, 1996.*
Ray, I., E. Bertino, S. Jajodia and L. Mancini "An Advanced Commit Protocol for MLS Distributed Database System", Proceedings of the 3rd ACM Conference on Computer and Communications Security, pp. 119–128, Jan. 1996.*
Cordis, "Workflow on Intelligent Distributed Database Environment", downloaded from www.cordis.com, 1999.*
Vonk, J., P. Grefen, E. Boertjes and P. Apers "Distributed Global Transaction Support for Workflow Management Applications" downloaded from www.cordis.com, 1999.*

(List continued on next page.)

*Primary Examiner*—Luke S. Wassum
(74) *Attorney, Agent, or Firm*—Richard M. Goldman; Ingrid Foerster

(57) ABSTRACT

System, method, and program product for managing transactions on a plurality of Database Management Systems residing on separate participant servers and a coordinator server. A single transaction proceeds by multiple steps across more then one of the plurality of Database Management Systems as participants. Savepoints are assigned to the participants across the Database Management System, with at least one savepoint within a multiple step transaction. The DBMS responds to application requests to rollback to savepoint by rolling back the transaction, across the Database Management System participants, to the savepoint Further disclosed is a program product that contains code, which, either as written on the medium, or as instantiated in RAM, or both, controls the operation of a distributed database management system.

4 Claims, 4 Drawing Sheets

Example 3

OTHER PUBLICATIONS

Oracle "Oracle8i Application Developer's Guide—Fundamentals", Release 8.5.1, downloaded from www.oracle.com. Feb. 1999.*

IBM "Taking Advantage of Application Savepoints in DB2 SQL", downloaded from www.ibm.com, Aug. 10, 2000.*

Cotner, C. "Recent DB2 for OS/390 Network Computing Enhancements", DB2 and IMS Technical Conference, Mar. 5–9, 2001.*

Gray J et al, *Transaction Processing: Concepts and Techniques*, Morgan Kaufmann Publishers, San Mateo, California 1993, pp 187–190;531–539;586–603.

IBM, *Method for Coordinating SQL Sursor States in a Client/Server Environment When using Nested Savepoints on a Relational Database*, Research Dislcosure 440135, Dec. 2000, p. 2183.

Dey, R.W., Shan, M.C., Traiger, I.L., *Method for Dropping Data Sets*, IBM Technical Disclosure Bulletin, vol. 25, No. 11A, Apr. 1983, pp. 5453–5455.

Grefen, P., Vonk, J., Boertjes, E., Apers, P., *Semantics and Architecture of Global Transaction Support in Workflow Envrionments*, Proceedings Fourth IFCIS Intl Conf on Cooperative Information Systems. CoopIS 99 (Cat. No. PR00384), pp. 348–353. Published Los Alamitos, CA, USA, 1999, xii+361 pp.

Kim, W., Whang, K., Lee, Y., Kim, S., *A Recovery Method Supporting User–interactive Undo In Database Management Systems*, Information Sciences vol. 114, No. 1–4 Mar. 1999, pp. 237–253.

Kim, S., Jung, M., Park, J., Park Y., *A Design and Implementation of Savepoints and Partial Rollbacks considering Transaction Isolation Levels of SQL2*, Proceedings $6^{th}$ Intl Conf. On advanced Systems for Advanced Applications, pp. 303–312, Published Los Alamitos, CA, USA, 1999, xii+356 pages.

Wieczerzycki, W., *Advanced Versioning Mechanisms Supporting CSCW Environments*, Journal of Systems Architecture, vol. 43, No. 1–5, Mar. 1997, pp. 215–227.

Wieczerzycki, W., *Long–Duration Transaction Support in Design Databases*, ACM CIKM International Conference on Information and Knowledge Management, Baltimore Maryland, USA, Nov. 28–Dec. 2, 1995., pp. 362–369348–353.

Park, Y. C., Park, J. H., *Mini–Savepoints: Firewall for Atomic Updates*, Advanced Database Research and Developments Series, vol. 6, International Conference on Database Systems for Advanced Applications, Melbourne, Australia, Apr. 1–4, 1997, pp. 293–302.

* cited by examiner

Example 1

Example 2

Example 3

METHOD FOR MANAGING DISTRIBUTED SAVEPOINTS ACROSS MULTIPLE DBMS'S WITHIN A DISTRIBUTED TRANSACTION

FIELD OF THE INVENTION

The invention relates to distributed database management systems and to the management of savepoints within distributed database management systems.

BACKGROUND OF THE INVENTION

A database is a storehouse of collected, recorded, and related data, with inherent value in the focus of the data elements, the logical coherency of data, the inherent meaning of the data, and the use to which the data can be put. Additionally, because of the database organization, the accessibility of records and files, and dynamic updatability of the data, the database has value far beyond the value of the sum of the individual elements of the database. The ability to routinely, repetitively, and consistently add data to the database, and to recover relevant, timely, correct data from the database, is a function of its database management system (DBMS). A DBMS is a collection of computer application programs that create the database organization (schema and metadata), and that store, retrieve, and update files in the database. Large databases are managed by complex database management systems (DBMS's) that have mechanisms to assure the timeliness and validity of the data. The mission critical requirement of a DBMS is that the data be correct and be current.

Correct data, that is collected and reported in a timely fashion, is critical to a multi-user database. This is the reason for concurrency control. Concurrency control assures that several users trying to access and update the same data do so in a controlled manner so that the results of the updates are correct, and also assures that readers of the data see current and committed data, not stale or uncommitted data. A typical example is the assignment of individual airplane seats in an airline reservations database. Even with many reservationists assigning many seats on many flights, the concurrency control capability of the DBMS must assure that only one passenger is assigned to one seat, and, conversely, that one seat is assigned to only one passenger 1. DBMS Access Statements Operations on database files include the "Data Manipulation" operations of SELECT, INSERT, UPDATE, and DELETE, among others.

2. The SELECT operation retrieves data from a database, and returns the data to the requestor.
  3. The INSERT operation enters data into a database.
  4. The UPDATE operation changes the value of an existing record.
  5. The DELETE operation deletes a record from the database.

2. Transaction Processing—Read and Write Operations of a Transaction

Those operations which change the file, as Insert, Delete, and Modify, require "Concurrency Control." These operations typically follow a Read operation and are a part of a Write operation. Typically the Read operation, e.g., Read_Item(x), reads a database item named "x" into a program value in the end user's program named "x". The Write_Item(x) operation writes the value of the end user program variable, x, into the database item x.

3. Transaction Processing—Concurrency Control

Concurrency control assures that several end users seeking to modify (insert, update, delete) records substantially simultaneously do so in a controlled manner, so that the data stored in the database is correct. It also assures that readers see current and committed data, rather then stale data or uncommitted data.

4. Transaction Processing and Transaction States

There are various means of controlling concurrency in a single database. Most common, by way of example, is "locking," so that when one user attempts to modify, update, or delete a record, no other user can access the record until the transaction is completed. A transaction may complete with commitment to the changes made by the transaction (COMMIT) or with reversal of the changes made by the transaction (transaction rollback). The decision to rollback a transaction may be that of the application program or may be a system decision (for example, in response to a condition preventing commit). "Completion" is a non-specific term, and can mean writing the data, or going beyond writing the data to "committing" the transaction, before allowing another user access to the record. Concurrency control results in either (1) "committing" the transaction, or (2) aborting the transaction and "rolling back" the database to a prior state.

In the context of concurrency control, and transaction logging, it is advantageous to break the model of items 1 and 2, above, into more granular levels or transaction states. Thus, the transactions can be broken down into the steps or transaction states of:

1. BEGIN_TRANSACTION which marks the beginning of a transaction.
  2. SELECT or INSERT which specify read or write operations on database items as part of a database transaction.
  3. END_TRANSACTION which specifies that the SELECT or INSERT operations have ended. These commands mark then end of transaction execution. It is at this point that the DBMS determines if the changes can be "committed", that is, permanently applied.
  4. COMMIT_TRANSACTION which signals a successful end of the transaction, the transaction will be committed to the database, and will not be undone.
  5. ROLLBACK or ABORT which signals that the transaction has ended unsuccessfully, and must be rolled back, that is, the changes to the database must be undone.

5. Transaction Processing—System Log

When concurrency control fails, and a concurrency problem arises, it is necessary to "roll back" the failed transactions. Transaction rollback is accomplished using the system log. The system log records transaction information as a transaction progresses. Typically the information includes a transaction ID, and before and after data images for every operation performed by a transaction. The progression of a transaction through stages of COMMIT or ROLLBACK are also recorded on the log.

Logging stops at the "Commit Point", which is when all operations that access the database have been executed successfully, and the effect of all of the transaction operations on the database have been recorded in the log or journal.

6. Transaction Processing—Recovery and Rollback

If a transaction fails to commit, the database must be rolled back to a previous state, before the failed transaction commenced. This is done by using the journal or log entries to reverse some of the changes in the database, and redo other changes in the database.

7. Transaction Processing—Recovery and Rollback—Savepoints

Savepoints are like bookmarks within a transaction. They may be created by an application between the beginning and end of a transaction. Savepoints allow modifications made to data and schemas since the setting of the savepoint to be undone via a request by the application to "rollback to savepoint". Savepoints make a set of non-atomic database requests or sub-transactions of an atomic transaction behave atomically, in that they are reversible as a unit. If an application error occurs during execution, or if the application detects an error, the savepoint can be used to undo changes made by the transaction between the time the savepoint was started and the time the savepoint rollback is requested, and return to a prior point in the transaction.

A savepoint is similar to a compound SQL statement, in that it allows grouping several SQL statements into a single executable block. Before the first statement of the block is executed, a savepoint request to start a savepoint block is required. If any of the subsequent statements end in an application error, the DBMS will roll back only that statement. This provides more granularity than a compound SQL statement, in which a single error anywhere in the block causes the entire block to end in an error and rolls back the entire compound SQL statement. At the end of a savepoint block of statements, one can either release the savepoint, or rollback to the savepoint.

Application savepoints provide control over the work performed by a subset of SQL statements in a transaction or unit of work. Within an application one can set a savepoint, and later either release the savepoint or roll back the work performed since the savepoint. It is also possible to use multiple savepoints and nested savepoints within a single transaction. The following code segment demonstrates the use of two savepoints within a single transaction to control the behavior of an application:

INSERT INTO order . . .
INSERT INTO order_item . . . lamp—set the first savepoint in the transaction
SAVEPOINT before_radio ON ROLLBACK RETAIN CURSORS
INSERT INTO order_item . . . Radio
INSERT INTO order_item . . . Power Cord
Pseudo-SQL:
IF SQLSTATE="No Power Cord"
ROLLBACK TO SAVEPOINT before_radio
RELEASE SAVEPOINT before_radio—set the second savepoint in the transaction
SAVEPOINT before_checkout ON ROLLBACK RETAIN CURSORS
INSERT INTO order . . . Approval
Pseudo-SQL:
IF SQLSTATE="No approval"
ROLLBACK TO SAVEPOINT before_checkout commit the transaction, which releases the savepoint
COMMIT In this code segment, the first savepoint enforces a dependency between two data objects where the dependency is not intrinsic to the objects themselves. One would not use referential integrity to describe the above relationship between radios and power cords since one can exist without the other. However, a seller would not want to ship the radio to the customer without a power cord. But, a seller also would not want to cancel the order of the lamp by rolling back the entire transaction because there are no power cords for the radio. Application savepoints provide the granular control that is needed to complete this order.

Savepoints gives a better performance and a cleaner application design than using multiple COMMIT and ROLLBACK statements. When a COMMIT statement is issued, the DBMS must do some extra work to commit the current transaction and start a new transaction. Savepoints allows breaking a transaction into smaller units or steps without the added overhead of multiple COMMIT statements. The following code segment demonstrates the performance penalty incurred by using multiple transactions instead of savepoints:

INSERT INTO order . . .
INSERT INTO order_item . . . lamp commit current transaction, start new transaction
COMMIT INSERT INTO order_item . . . Radio
INSERT INTO order_item . . . Power Cord
Pseudo-SQL:
IF SQLSTATE="No Power Cord"roll back current transaction, start new transaction
ROLLBACK
ELSE commit current transaction, start new transaction
COMMIT
INSERT INTO order . . . Approval
Pseudo-SQL:
IF SQLSTATE="No approval"roll back current transaction, start new transaction
ROLLBACK
ELSE commit current transaction, start new transaction
COMMIT Another drawback of multiple commit points is that an object might be committed and therefore visible to other applications before it is fully completed. In example 2, the order is available to another user before all the items have been added, and worse, before it has been approved. Using application savepoints avoids this exposure to 'dirty data' while providing granular control over an operation.

In comparing application savepoints to compound SQL blocks, savepoints offer the following advantages over compound SQL blocks: enhanced control of transactions; less locking contention; and improved integration with application logic.

Compound SQL blocks can either be ATOMIC or NOT ATOMIC. If a statement within an ATOMIC compound SQL block fails, the entire compound SQL block is rolled back. If a statement within a NOT ATOMIC compound SQL block fails, the commit or roll back of the transaction, including the entire compound SQL block, is controlled by the application. In comparison, if a statement within the scope of a savepoint fails, the application can roll back all of the statements in the scope of the savepoint, but commit the work performed by statements outside of the scope of the savepoint. This option is illustrated in the first code segment, if the work of the savepoint is rolled back, the work of the two INSERT statements before the savepoint is committed. Alternately, the application can commit the work performed by all of the statements in the transaction, including the statements within the scope of the savepoint.

When a user issues a compound SQL block, a DBMS, such as IBM DB2 Relational Database Management System, simultaneously acquires the locks needed for the entire compound SQL block of statements. When a user sets an application savepoint, the DBMS acquires locks as each statement in the scope of the savepoint is issued. The locking behavior of savepoints can lead to significantly less locking contention than compound SQL blocks, so unless an application requires the locking performed by compound SQL statements, it may be best to use savepoints.

Compound SQL blocks execute a complete set of statements as a single statement. An application cannot use control structures or functions to add statements to a compound SQL block. In comparison, when you set an application savepoint, the application can issue SQL statements within the scope of the savepoint by calling other application functions or methods, through control structures such as while loops, or with dynamic SQL statements. Application savepoints give a user the freedom to integrate SQL statements with application logic in an intuitive way. For example, in the following code segment, the application sets a savepoint and issues two INSERT statements within the scope of the savepoint. The application uses an IF statement that, when true, calls the function add_batteries( ). add_batteries( ) issues an SQL statement that in this context is included within the scope of the savepoint. Finally, the application either rolls back the work performed within the savepoint (including the SQL statement issued by the add_batteries( ) function), or commits the work performed in the entire transaction:

void add_batteries( )
{
the work performed by the following statement—is controlled by the savepoint set in main( ) INSERT INTO order_item . . . Batteries
} void main(int argc, char[ ] *argv)
{
INSERT INTO order . . .
INSERT INTO order_item . . . lamp set the first savepoint in the transaction
SAVEPOINT before_radio ON ROLLBACK RETAIN CURSORS
INSERT INTO order_item . . . Radio
INSERT INTO order_item . . . Power Cord
if (strcmp(Radio.power_source( ), "AC/DC"))
{
add_batteries( );
}
Pseudo-SQL:
IF SQLSTATE="No Power Cord"
ROLLBACK TO SAVEPOINT before_radio
COMMIT
}

Savepoints thus provide a high degree of granularity, even within atomic processes, 8. Distributed Databases Distributed databases are becoming increasingly important. This is motivated by such concerns as the distributed nature of modem enterprises, increased reliability and maintainability of multiple servers, data sharing across the global or distributed enterprise, and improved performance when a large database is distributed over multiple sites, with a capability of processing local transactions locally. However, the decentralization of multiple servers supporting multiple, interacting DBMS's and distributed databases requires data networking, data distribution and replication management functionality, execution strategies for queries and transaction and queries that span multiple servers, consistency strategies across multiple servers, and the ability to recover from local disturbances and communications failures.

"Distributed Transactions" are transactions impacting records and/or files in multiple DBMSs of a Distributed Database DBMS.

9. Distributed Databases—Data Fragmentation

A further aspect of distributed databases is data fragmentation. Data fragmentation arises from three strategies, storing some tuples in some servers and other tuples in other servers (horizontal fragmentation), storing some attributes in some servers and other attributes in other servers (vertical fragmentation), and storing some attributes of some tuples in one server, other attributes of the same tuples in another server, some attributes other tuples in still another server, and still other attributes of the other tuples in still another server (mixed fragmentation). The fragments are mapped in a fragmentation schema that defines all of the attributes of all of the fragments, and an allocation schema that maps fragments to sites.

10. Distributed Databases—Concurrency Control and Recovery in Distributed Databases As would be expected, regardless of the degree of replication between the nodes, multiple databases on single platforms, and distributed databases with multiple servers have complex concurrency problems. The concurrency control system of the DBMS must maintain concurrency between multiple database entries. It must deal with individual site failures as well as communications network failures. And, it must deal with commit procedures that are accessing database fragments and replications stored on multiple sites, where some sites or communications links may fail during the commit process. Various strategies are used to cope with commit failures in multiple and distributed database systems, including primary site techniques, primary copy techniques, and voting techniques.

11. Distributed Databases—Savepoints and Recovery in Distributed Databases

U.S. Pat. No. 5,630,124 to Coyle et al., for System And Method For Assuring Atomicity Of Distributed Update Requests In A Parallel Database describes a method of managing distributed requests in a parallel multiple database management system. As described by Coyle et al., a savepoint that is normally visible to only one DBMS is extended to all of the parallel DBMS's participating in the transaction. This allows an application to set a savepoint on one DBMS and rollback to the same savepoint on another DBMS. The savepoint is identified across networked connections with a message from a coordinating server to participating servers. This message creates a local savepoint on the participant. The participant sends a message back to the coordinating server indicating the success or failure of the execution of the underlying transaction, and, in the event of failure on a local server, a rollback of the transaction on the local server and the other servers.

Coyle et al describe how, responsive to the initiation of a transaction, a request counter for a coordination process is initialized. Upon each receipt of a request for distribution by the coordination process, the request counter is incremented. Request instances, including savepoint data, are generated for each request and distributed to selected subordinate processes on different nodes for the partitions of the database. Upon receipt of a request instance on a selected subordinate process, a local savepoint with the request savepoint data and locally generated savepoint data is stored for each selected subordinate process. When an attempt is made to execute the request instance, the success or failure of the execution attempt is returned to the coordination process. This is done for each request instance. On an indication of failure of execution for any request instance, a rollback is performed on each subordinate process on which the local savepoint indicates execution of a request instance for the request.

Because of the added levels of complexity arising from multiple server sites, communications networks, fragmentation, and replication, a need exists to provide a level of control that is more granular then the "commit-rollback" methodology. A need exists for a savepoint methodology that is functional with fragmented and replicated databases on multiple servers joined together over a telecommunications network.

SUMMARY OF THE INVENTION

The problem of implementing savepoints in distributed database systems is obviated by the method, system, and program product described herein, which provides savepoint functionality across fragmented and replicated database elements distributed over multiple servers and joined together by one or more communications networks.

The method, system, and program product of the invention provides for identifying distributed savepoints, messages containing savepoint data (savepoint name, the name of the server that created the savepoint, and the server's savepoint sequence number) between servers participating in the transaction and a coordinator server. One message goes from a coordinator server to a participant server, identifying savepoint identifiers that have been rolled back since the sever was last contacted, the cursor disposition (open or closed) identified with each rollback; the savepoint identifiers of any new savepoints that are still in effect since the server was last contacted, and the savepoint identifiers of any savepoints that have been released since this particular server was last contacted.

Each participant DBMS sends a message to the coordinator DBMS identifying any savepoint identifiers that have been rolled back since the last message (along with the cursor disposition), the savepoint identifiers of any savepoints that are still in effect that were established since the last message, and the savepoint identifiers of any savepoints that have been released since the last message.

Also, each time an SQL result set is returned to a requestor, the server sends the sequence number associated with the cursor to the requester. This is so that the result set can be positioned correctly within the savepoints in the task or transaction or other unit of work.

Concurrency, coherency, accuracy, and timeliness are attained by the method, system, and program product described herein. One embodiment of the invention is a method of managing transactions on a plurality of DBMSs residing on separate participant servers and a coordinator server, where a single transaction comprises multiple steps across more than one of the plurality of DBMSs as participants.

According to the method of the invention, savepoints are assigned to the participants across a network of DBMSs, with at least one savepoint set within a multiple step transaction, that is, a transaction having multiple sub-transactions. If, as the transaction progresses, a request to rollback to savepoint is received, the method of the invention calls for rolling back operations performed since the savepoint across the DBMS participants. When the transaction is accepted by the application (even in the face of reasons to reject the transaction), the transaction is accepted across the multiple DBMS participants.

Establishing and managing the savepoints is accomplished by assigning savepoint identifiers to savepoints; sending a message from the coordinator server to the multiple database management system participants that are participants in the transaction identifying the savepoint and providing savepoint information; sending messages from the multiple database management system participants in the transaction to the coordinator server with respect to the savepoint while processing the SQL request, and providing savepoint information; and returning a transaction result set to a requester.

Sending a message from the coordinator server to the multiple database management system participants identifying the savepoint and providing savepoint information comprises sending a message from the coordinator server to the multiple database server participants actually participating in the transaction identifying savepoints that have been rolled back since the database server was last notified, savepoints that are still in effect; and savepoints that have been released. Sending messages from the multiple database management system participants to the coordinator server with respect to the savepoint and providing savepoint information comprises sending a message from the multiple database sever participants to the coordinator server identifying savepoint information since the savepoint was established, that is, savepoints that have been rolled back during this request, savepoints that are still in effect, and savepoints that have been released A sequence number, as used herein, establishes and shows a times of result set generations and savepoint activities, associating result sets and savepoints. Returning an SQL result set to a requester comprises flowing a sequence number associated with a cursor associated with the result set to the requester so that the result set can be associated with and positioned correctly within savepoints.

A further embodiment of the invention is a distributed DBMS comprising a plurality of individual DBMSs, as participants, in a transaction residing on separate servers, and including a coordinator server. The distributed DBMS is configured and controlled to process transactions which transactions comprise multiple steps, that is, sub-transactions, across more then one of the plurality of DBMSs as participants. This is done by a method comprising assigning across the DBMS participants at least one savepoint within a multiple step transaction, and responding to application requests to rollback to savepoint by undoing operations performed by the transaction since the savepoint across the DBMS participants.

The distributed database management system is further configured and controlled to establish and manage the savepoints by the method of assigning savepoint identifiers to savepoints, sending a message from the coordinator server to the multiple database management system participants identifying the savepoint and providing savepoint information, sending messages from the multiple database management system participants to the coordinator server with respect to the savepoint and providing savepoint information; and returning a transaction result set to a requester.

A still further embodiment of the invention is a program product. The program product, which may be installation tapes, disks, diskettes, or on disks on an installation server, or storage media on the individual servers, as disk drives, tape drives, memory arrays, or a combination thereof, is in the form of a storage medium having computer readable program code thereon. This code, either as written on the medium, or as instantiated in RAM, or both, controls the operation of a distributed database management system, The system contains a plurality of individual DBMSs, i.e., participants, residing on separate servers and including a coordinator server. The program code configures and controls the database management system to process transactions, which comprise multiple steps, that is, sub-transactions, across more then one of said plurality of DBMSs as participants. This is done by the method comprising assigning across the DBMS participants at least one savepoint within a transaction having multiple sub-transactions (steps). If a reason for rejection is found the transaction is rolled back across the DBMS participants to a savepoint.

The program code of the program product configures and controls the individual DBMSs to establish and manage the savepoints by the method of assigning savepoint identifiers to savepoints, sending a message from the coordinator server to the multiple database management system participants identifying the savepoint and providing savepoint information, sending messages from the multiple database management system participants to the coordinator server with respect to the savepoint and providing savepoint information, and returning a transaction result set to a requester.

The method of the invention is useful with any DBMS that uses SQL, especially Relational Database Management Systems (RDBMS), although it may be used with, for example the Integrated Database Management System ("CODASYL"), various network database paradigms, and the like.

THE FIGURES

Aspects of the invention are illustrated in the FIGURES attached hereto and described herein.

FIG. 1 illustrates a multi-database, multi-server DBMS.

FIG. 2 illustrates a distributed transaction where DBMS A is the "root" of the distributed transaction, and DBMS B and DBMS C are both subordinate to DBMS A, and DBMS C is subordinate to DBMS B, acting only as a participant. In the system illustrated in FIG. 2 the coordinator, DBMS A issues all of the savepoint commands, and the participant just receives savepoint requests over the network, without issuing any savepoint requests of its own.

DETAILED DESCRIPTION OF THE INVENTION

This invention is a method, system, and program product to set, rollback, and release savepoints across multiple databases management systems (DBMS) within a distributed transaction across the multiple DBMSs. Typically, the method, system, and program product of the invention are used in conjunction with Relational Database Management Systems (RDBMS), although, the method, system, and program product of the invention may be used with any DBMS using SQL (Structured Query Language). With the SAVEPOINT SQL statement, milestones within a transaction may be demarked. Data and schema changes made since the savepoint may then be undone, as application logic requires, without affecting the overall outcome of the transaction. Rollback to savepoint can also be used to optionally close SQL cursors opened since the savepoint was established.

The invention provides a method to uniquely establish and identify a global savepoint within a distributed transaction. The invention also provides a method for the transaction coordinator (DBMS A) to identify to all of the participants (DBMS B) of a distributed transaction, a list of savepoints set or rolled back within the transaction since the last request. Finally, a method is provided for a participant to identify to the coordinator all savepoints set, released, or rolled back when returning a request to the coordinator.

Figure 1:
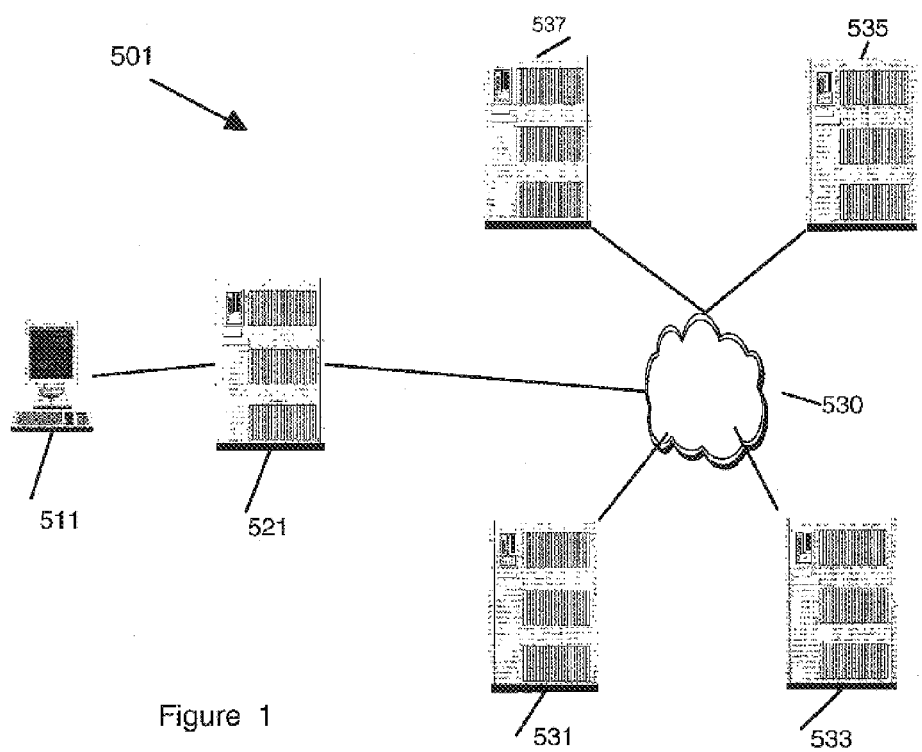

The invention is practiced in a network environment. FIG. 1 illustrates a network having a plurality of servers, 531, 533, 535, and 537, and a coordinator server, 521. The servers are connected through a network, 530. The coordinator server, 521, provides connectivity for a client application, 511. The client application initiates a database access by attempting to do one of searching the databases, inserting data, updating data, or deleting data. The transaction involves data and database management systems on the coordinator, 521, and several of the servers, 531, 533, 535, and 537.

This invention uses four items to manage savepoints across multiple DBMS servers that are participating in a distributed transaction:

First is creating, identifying, and managing savepoints to DBMS servers when using a network connection. This is accomplished through messages from the coordinator by an SQL request containing the savepoint name, the name of the server that created the savepoint, and the server's savepoint creation sequence number to uniquely identify a savepoint. As used herein, the term "savepoint identifiers" describe these three values.

Second is flowing subsequent messages from the coordinator server to participant DBMS servers, typically with SQL requests or queries, including cursors and locks, identifying:

1. The savepoint identifiers that have been rolled back since this server was last contacted (if any). This message also includes the cursor disposition (open or close) associated with a rollback.
2. The savepoint identifiers of any new savepoints that are still in effect since this server was last contacted (if any).
3. The savepoint identifiers of any savepoints that have been released since this server was last contacted (if any).

Third, is flowing a message, typically a REPLY to a request from an application program, from a participant DBMS server back to the coordinator DBMS server, typically on a reply to an SQL request, identifying:

1. The savepoint identifiers that have been rolled back during this request (if any), along with the cursor disposition that was specified on each rollback request.
2. The savepoint identifiers of any new savepoints still in effect that were established during this request (if any).
3. The savepoint identifiers of any savepoints that have been released during this request (if any).

Fourth, each time an SQL result set is returned to a requester, the server flows the sequence number associated with the cursor to the requester so that the result set can be positioned correctly within the savepoints in the unit of work.

With use of the above items, the DBMS servers involved in a distributed transaction can communicate any savepoint activity across the servers involved in the distributed transaction with minimal additional network messages, and derive the correct cursor state for each of the SQL cursors.

The SQL3 standard has proposed a standard for savepoints within a single DBMS. Several commercial DBMS products (e.g. Oracle and Sybase) currently support these non-distributed savepoints. However, none of the commercial DBMS vendors extend savepoint operations to a distributed transaction that involves multiple DBMS systems and/or servers.

This invention extends the SQL3 savepoint concept to be distributed across multiple DBMS's and servers, allowing database interoperability for distributed transactions, with minimal additional network overhead. A distributed savepoint represents the state of data and schemas at some particular point in time for a transaction across all of the DBMS's involved in a distributed transaction. Savepoints have unique names and one speaks of setting a savepoint (of name <savepoint name>). One may then return data and schemas to the state in which they existed at the time the savepoint was set by restoring (rolling back) to the savepoint.

A distributed savepoint is visible to all database management systems involved in the transaction after a savepoint is set. The scope of a savepoint may be linear with the execution of SQL statements within a transaction. When the scope of savepoints is linear, newer savepoints may replace older ones of like name. For example, if transaction executing at DBMS A sets a savepoint S and then invokes a stored procedure at DBMS B that rollbacks savepoint S, all return data and schemas on DBMS A and DBMS B since savepoint S was set must be rolled back to the state prior to the savepoint S.

When a server in a distributed transaction OPENs a new cursor, the server generates a new sequence number M that identifies how the cursor fits within the sequence of savepoints in the distributed transaction. The value M is calculated by $$M=1+MAX$$

where MAX is the max of a previous savepoint number and the previous open sequence number, and N is a previous OPEN sequence number. The value M must be transmitted to any SQL requester that issues an OPEN request or receives a stored procedure result set. The value M is used to determine which cursors should be closed on a ROLLBACK TO SAVEPOINT request. For example, a stored procedure might issue the following sequence of SQL statements:

OPEN C1 (sequence number M=5)
OPEN C2 (sequence number M=6)
SAVEPOINT XYZ (sequence number M=7)
OPEN C3 (sequence number M=8)

With that sequence of SQL statements, a ROLLBACK TO XYZ (sequence number 7) would impact the status of cursor C3 (sequence number 8), but not the other two cursors (because their sequence numbers are prior to 7).

When a server in a distributed transaction creates a new savepoint, it must add the new savepoint identifiers to the list of active savepoints. The savepoint sequence number is an integer whose value is M+1, where M is equal to MAX (previous savepoint number, previous OPEN sequence number).

Following the creation of a new savepoint that is still in effect, the server transmits the new savepoint identifiers on first access to any coordinator or participant server accessed after the savepoint is created.

When a server in a distributed transaction rolls back to a savepoint, it delivers a message containing the savepoint identifiers and cursor disposition to each coordinator or participant server that has been accessed since the savepoint was created. This message can be delivered immediately following the rollback to savepoint, or delayed until the next SQL message is transmitted to the server. The decision to send the message immediately or to delay it may be made by the DBMS, the operating system, or both, and is typically based on balancing database concurrency against network performance.

The server also closes each SQL cursor that has a sequence number greater than the savepoint sequence number (if the cursor disposition is close).

When a server in a distributed transaction receives a message indicating a new savepoint has been established, the server must add the new savepoint identifiers to the list of active savepoints. The savepoint sequence number is obtained from the value provided in the savepoint identifiers. The server then transmits the savepoint identifiers to all coordinator and participant servers that are accessed following the creation of the savepoint, with the exception of the coordinator server that delivered the savepoint identifier to this participant server. The message provides an enumeration of all savepoints impacted by the creation of new cursors and locks and associated savepoints. When replying, the list of savepoint identifiers is returned to the coordinator.

When a server in a distributed transaction receives a message indicating that a rollback to savepoint has been issued, the server first examines the active savepoint list to verify that the savepoint exists. If the savepoint was valid, the server rolls back to the specified savepoint. If the cursor disposition is close, the server closes each SQL cursor and lock that has a sequence number greater than the savepoint sequence number.

The server must also transmit the savepoint identifiers and cursor disposition to each coordinator or participant server that was accessed after the savepoint was created, with the exception of the server that delivered the savepoint identifier to this server. These messages can be sent immediately, or delayed until the next message is delivered to the server(s). This is a matter of balancing network load against database concurrency.

When a server in a distributed transaction releases a savepoint, the server first verifies that the savepoint is listed as an active savepoint. If the savepoint exists, the server delivers a message containing the savepoint identifiers to each participant or coordinator server that has been accessed since the savepoint was created. Lastly, the server removes the savepoint from the list of active savepoints. These messages can be sent immediately, or delayed until the next message is delivered to the server(s).

When a server in a distributed transaction receives a message indicating a savepoint has been released, the server first validates that the savepoint exists in the list of active savepoints. If the savepoint exists, the server delivers a message containing the savepoint identifiers to each participant or coordinator server that has been accessed since the savepoint was created, with the exception of the server that delivered the savepoint identifiers to this server. These messages can be sent immediately, or delayed until the next message is delivered to the server(s). Lastly, the server removes the savepoint from the list of active savepoints.

While the invention is described and illustrated with respect to relational database management systems (RDBMS), the method, system, and program product of the invention are applicable to other DBMS paradigms.

EXAMPLES

Figure 2:
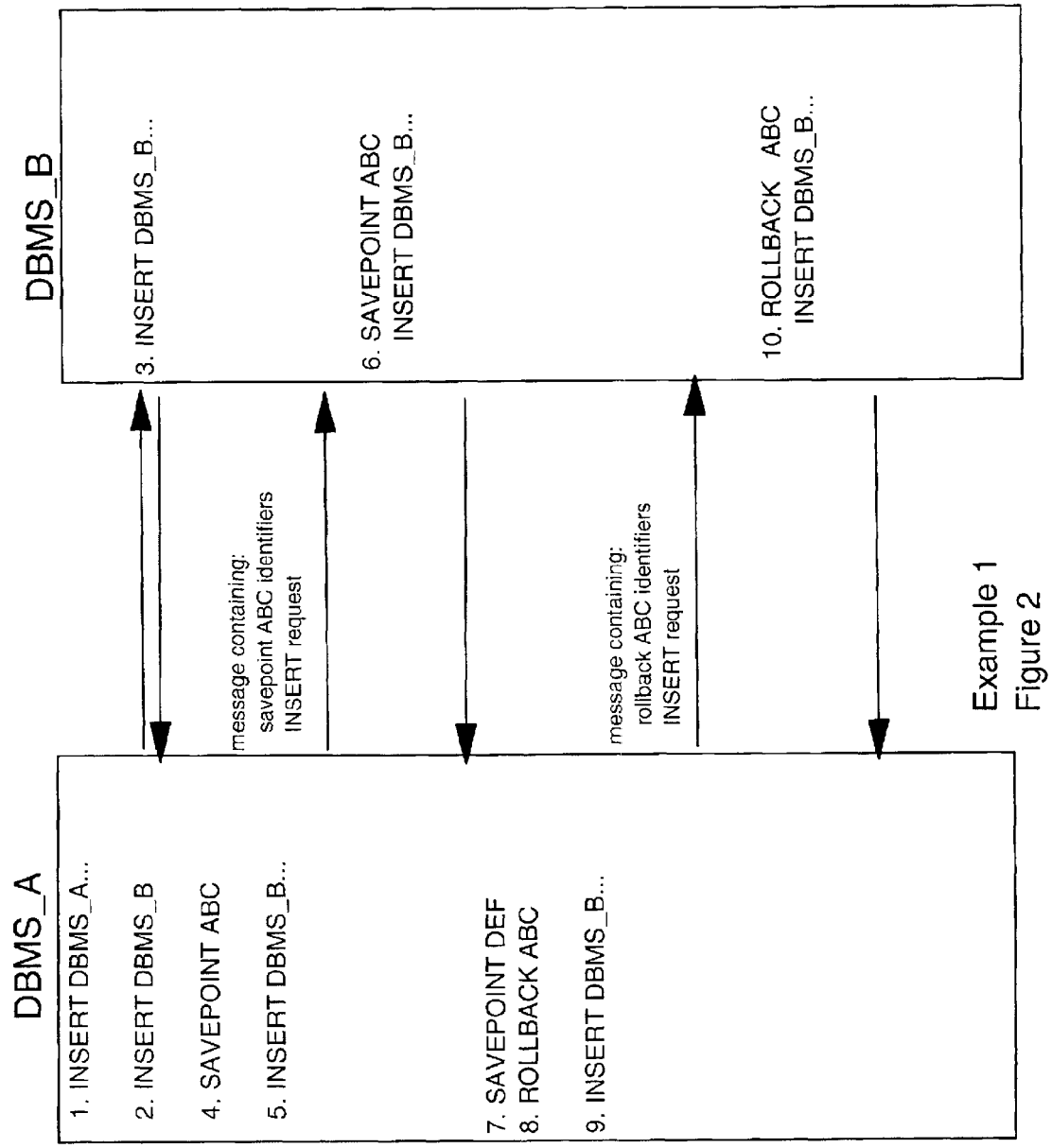
Figure 3:
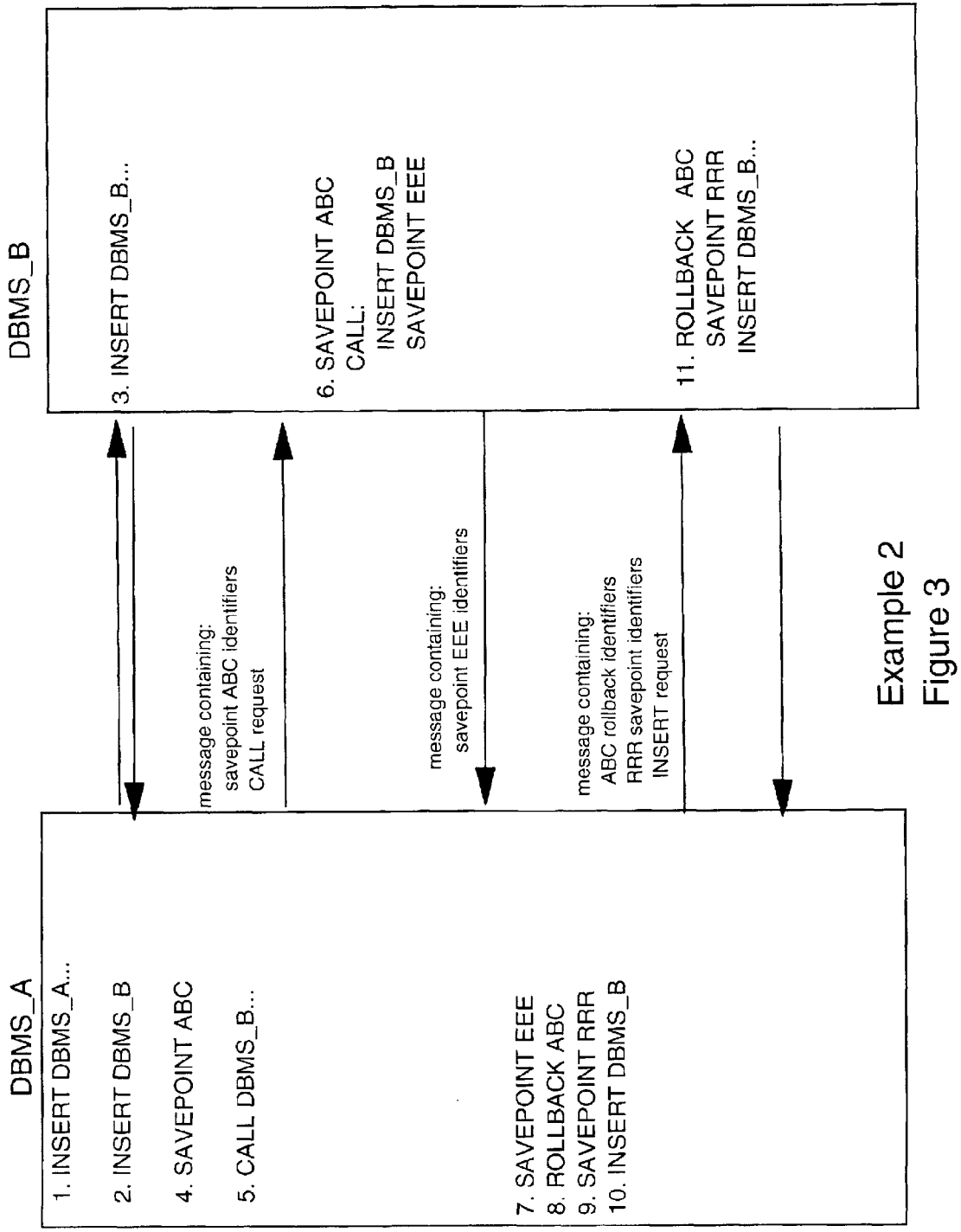
FIG. 3 illustrates a distributed transaction where DBMS A is the "root" of the distributed transaction, and DBMS B and DBMS C are both subordinate to DBMS A, and DBMS C is subordinate to DBMS B, acting only as a participant. In the system illustrated in FIG. 3 both the coordinator, DBMS A and subordinate server DBMS B issue savepoint commands.
Figure 4:
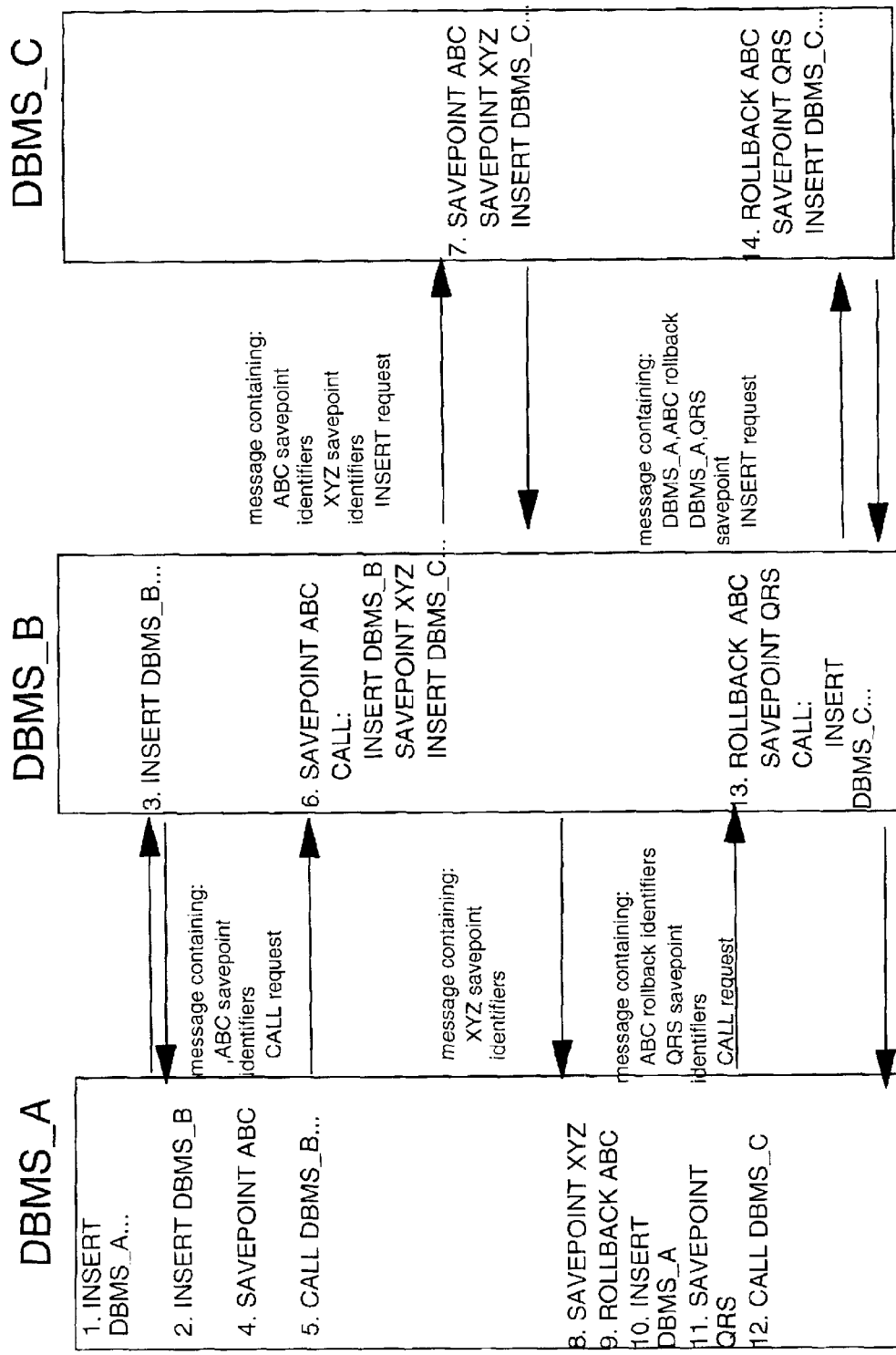
FIG. 4 illustrates a distributed transaction where DBMS A is the "root" of the distributed transaction, and DBMS B and DBMS C are both subordinate to DBMS A, and DBMS C is subordinate to DBMS B, acting only as a participant. In the system illustrated in FIG. 4 all three servers participate in savepoint transaction.

Examples 1 through 3, shown in FIGS. 2, 3, and 4, illustrate the practical application of the savepoint method, system, and program product of our invention.

The examples that follow demonstrate how the distributed savepoint method, system, and program product are used to coordinate savepoint operations across a distributed network of DBMS servers. In the examples, there are three DBMS servers:

1. DBMS_A is the "root" of the distributed transaction. It acts as the coordinator of the distributed transaction.
2. DBMS_B is subordinate to DBMS_A. DBMS_B is a participant in the distributed transaction, and in turn invokes a participant DBMS server (DBMS_C). DBMS_B is the coordinator of this participant server.
3. DBMS_C is subordinate to DBMS_B. DBMS_C acts only as a participant, since there are no participant servers below DBMS_C.

In Example 1, illustrated in FIG. 2, the coordinator issues all of the savepoint commands, and the participant just receives the savepoint requests over the network. The participant responds to the coordinator's requests, but doesn't issue any savepoint requests of its own.

In this example, a message containing Savepoint ABC identifiers issues an INSERT request. DBMS_A inserts a row to a local table 1. An INSERT is directed to remote server DBMS_B, 2. The remote server performs the INSERT and responds, 3. DBMS_A takes SAVEPOINT ABC, 4, and adds ABC to the list of active savepoints, 5, but does not send a message to DBMS_B (to avoid network overhead). When INSERT for DBMS_B is detected, DBMS_B uses this opportunity to flow the savepoint request to the remote sever with the savepoint identifiers. At this point, DBMS_B performs the savepoint operation, and also performs the INSERT operation, 6. A reply is returned to indicate success of the operation.

DBMS_A takes another savepoint DEF, 7. This information is added to the list of active savepoints, but no message flows (to save on network flows). DBMS_A rolls back to savepoint ABC, 8. This backs out savepoint DEF. In this example, we don't flow a network message on the rollback, but an implementation could flow a message on each ROLLBACK if lock contention is a concern.

On next reference to DBMS_B, 9, the name and creator of the rolled back savepoint is transmitted along with the INSERT statement. Note that savepoint DEF is not transmitted to DBMS_B, since the rollback to ABC removed DEF from the list of "new active Savepoints". DBMS_B performs the requested rollback 10 (which backs out the INSERT operation from step 5/6) and performs the next requested INSERT. A reply message is returned indicating successful completion.

Example 2, is illustrated in FIG. 3. In this second example, both coordinator and participant issue savepoint commands. In this example, DBMS_A inserts a row to a local table, 1. Next, an INSERT is directed to remote server DBMS_B, 2. The remote server performs the INSERT and responds, 3. The DBMS_A takes SAVEPOINT ABC and adds ABC to the list of active savepoints, 4, but does not send a message to DBMS_B (to avoid network overhead).

When CALL for a procedure at DBMS_B is detected, DBMS_A uses this opportunity to flow the savepoint identifiers to the remote sever, 5. DBMS_B performs the savepoint operation, and also calls the stored procedure. The stored procedure inserts a row and creates a new savepoint EEE. A reply is returned to indicate success of the operation, and report creation of savepoint to DBMS_A, 6. DBMS_A takes savepoint identified by DBMS_B, 7. DBMS_A rolls back to savepoint ABC. This backs out savepoint EEE, but no network flow yet, 8. DBMS_A takes a new savepoint RRR, 9. This is recorded in list of active savepoints for later use. INSERT to DBMS_B causes both the ROLLBACK and the new savepoint to flow to DBMS_B, 10. RBDMS_B performs the requested savepoint and insert operations, 11.

Example 3 is illustrated in FIG. 4. In this last example, we show more complex interactions between three DBMS servers. In this Example DBMS_A requests an insert, 1. Next, DBMS_A request DBMS_B to insert, 2, which DBMS_B does, and notifies DBMS_A. DBMS_A next issues a SAVEPOINT ABC, 4, calls DBMS_B with a message containing the ABC savepoint identifiers and a CALL request, 5. DBMS_B receives the savepoint identifiers and the CALL request with the ABC identifier, and sends a message to DBMS_C containing the ABC savepoint identifiers, the identifiers for a new savepoint, XYZ, and an INSERT, 7. DBMS_C enters the savepoints ABC and XYZ, and performs the INSERT, and broadcasts a message to DBMS_A, 8. DBMS_A enters the savepoint XYZ, 8, and rolls back savepoint ABC, 9. DBMS_A then inserts a file, 10, creates savepoint QRS, and calls DBMS_C with a message containing the ABC rollback identifiers, the QRS savepoint identifiers, and a call request. The message to rollback savepoint ABC, enter savepoint QRS, call, and insert in DBMS_C goes through DBMS_B, and a new message is sent to DBMS_C with the DBMS_A ABC rollback, the DBMS_A QRS savepoint, and the INSERT request. DBMS_C rolls back ABC, enters savepoint QRS, and INSERTS DBMS_C, 14, and sends a message to DBMS_A and DBMS_B.

While the invention has been described with respect to certain preferred embodiments and exemplifications, the invention is not to be limited thereby, but solely by the claims appended hereto.

We claim:

1. A method of managing transactions on a plurality of database management systems residing on separate servers and including a coordinator server, wherein a single transaction comprises multiple steps across more then one of said plurality of database management systems as participants, said method comprising:
   a) assigning across the database management system participants at least one savepoint with a savepoint identifier within a multiple step transaction;
   b) sending a message from the coordinator server to the multiple database management system participants in the transaction identifying the savepoint and providing savepoint information;
   c) if an application decision to reject a step of the transaction is found, rolling back the transaction across the database management system participants to a savepoint;
   d) when no application decisions to reject the transaction are found, COMMITING the transaction across the multiple database management system participants;

e) sending messages from replying multiple database management system participants to the coordinator server with respect to the savepoint and providing savepoint information comprising sending a message from the multiple database server participants to the coordinator server at the time of rolling a step of the transaction back to a savepoint, releasing a savepoint, completing a request, or replying to a request, said message identifying:
   1) savepoints that have been rolled back during this request;
   2) savepoints that are still in effect;
   3) savepoints that have been released; and
f) returning result sets to a requester.

2. The method of claim 1 wherein the step of returning a result set to a requester further comprises flowing a sequence number associated with a cursor associated with the result set to the requester so that the result set can be positioned correctly within savepoints.

3. A program product comprising a storage medium having computer readable program code thereon for controlling the operation of a distributed database management system, the distributed database management system comprising a plurality of individual database management systems residing on separate servers and including a coordinator server, said program code configuring and controlling the database management system to process transactions which comprise multiple steps across more then one of said plurality of database management systems, as participants, by the method comprising:
   a) assigning across the database management system participants at least one savepoint with a savepoint identifier within a transaction comprising multiple steps;
   b) sending a message from the coordinator server to the multiple database server participants identifying:
      1) savepoints that have been rolled back since the database server was last notified;
      2) savepoints that are still in effect; and
      3) savepoints that have been released;
   c) if an application decision is made to reject the step is found, rolling back the step across the database management system participants to a savepoint;
   d) the database management system participants sending messages to the coordinator server with respect to executing the savepoint or completing a step in the transaction, and providing savepoint information; and
   e) returning a result set to a requester.

4. A program product comprising a storage medium having computer readable program code thereon for managing a distributed database management system, said distributed database management system comprising a plurality of individual database management systems residing on separate servers and including a coordinator server, said program code configuring and controlling the distributed database management system to process transactions which comprise multiple steps across more then one of said plurality of database management systems, as participants, by the method comprising the steps of:
   a. assigning savepoint identifiers to savepoints;
   b. sending a message from the coordinator server to the multiple database server participants identifying:
      1) savepoints that have been rolled back since the participant database server was last notified;
      2) savepoints that are still in effect;
      3) savepoints that have been released;
   c. sending a message from the multiple database sever participants to the coordinator server identifying:
      1) savepoints that have been rolled back during this request;
      2) savepoints that are still in effect;
      3) savepoints that have been released; and
   d. returning an SQL result set to a requester, and flowing a sequence number associated with a cursor associated with the result set to the requester so that the result set can be associated with and positioned correctly within the savepoints.

* * * * *